(12) United States Patent
Khan

(10) Patent No.: US 6,175,536 B1
(45) Date of Patent: Jan. 16, 2001

(54) CROSS-WELL SEISMIC MAPPING METHOD FOR DETERMINING NON-LINEAR PROPERTIES OF EARTH FORMATIONS BETWEEN WELLBORES

(75) Inventor: Tawassul A. Khan, Cypress, TX (US)

(73) Assignee: Western Atlas International, Inc., Houston, TX (US)

( * ) Notice: Under 35 U.S.C. 154(b), the term of this patent shall be extended for 0 days.

(21) Appl. No.: 08/845,987

(22) Filed: May 1, 1997

(51) Int. Cl.[7] ....................................................... G01V 1/00

(52) U.S. Cl. ............................... 367/32; 367/30; 367/75; 702/14

(58) Field of Search .................................. 367/31, 75, 32, 367/30, 27, 57, 38, 49; 702/14

(56) References Cited

U.S. PATENT DOCUMENTS

| | | | |
|---|---|---|---|
| 5,144,590 | * | 9/1992 | Chon ........................................ 367/49 |
| 5,485,431 | * | 1/1996 | Johnson et al. ......................... 367/31 |
| 5,740,125 | * | 4/1998 | Chon ........................................ 367/75 |

OTHER PUBLICATIONS

Johnson, P.A., Rasolofosaon, P.N.J.; Manifestation of Non-linear Elasticity in Rock: Convincing Evidence Over Large Freuquency and Strain Intervals from Laboratory Studies; Journal: Nonlinear Processes in Geophysics.

\* cited by examiner

Primary Examiner—Christine Oda
Assistant Examiner—Anthony Jolly
(74) Attorney, Agent, or Firm—K. P. Sriram; D. M. Springs

(57) ABSTRACT

A method for determining a degree of acoustic non-linearity of an earth formation from seismic signals transmitted into the formation from within one wellbore and received from the formation in another wellbore. The seismic signals include two selected discrete frequencies. The method includes spectrally analyzing the received signals, determining from the spectral analysis the presence of a frequency representing a sum of the two selected frequencies, and determining a relative amplitude of the sum frequency with respect to the amplitudes of the two selected discrete frequencies. In a particular embodiment, the method includes determining the presence of a frequency in the spectrally analyzed signals representing the difference between the selected discrete frequencies, and determining the presence of harmonic multiples of one of the two selected discrete frequencies.

9 Claims, 4 Drawing Sheets

CROSS-WELL SEISMIC MAPPING METHOD FOR DETERMINING NON-LINEAR PROPERTIES OF EARTH FORMATIONS BETWEEN WELLBORES

BACKGROUND OF THE INVENTION

1. Field of the Invention

The invention is related to the field of seismic energy mapping of earth formations. More specifically, the invention is related to methods of determining non-linear elastic properties of earth formations which are geologically interconnected between wellbores by measuring seismic energy transmission properties of the earth formations between the wellbores.

2. Description of the Related Art

Subterranean earth formations sometimes contain zones permeable to fluid flow called reservoirs. Wellbores are drilled into reservoirs for extracting the fluids, which can include commercially useful materials such as petroleum. Wellbore operators are particularly concerned about the geologic structure of reservoirs, as this structure affects the placement of the wellbores used to extract the fluids. Wellbore operators are also concerned with the degree of continuity of hydraulic properties, and the degree of heterogeneity of the reservoir between the wellbores in order to estimate the future volumetric production of fluids from the reservoir.

Various methods are known in the art for inferring the geologic structure of the reservoir and the hydraulic properties of the reservoir from measurements made at the earth's surface, such as reflection seismic surveying. Other methods known in the art include correlation, between wellbores, of measurements made from within each of the wellbores such as measurements made from various types of well logging instruments known in the art.

A method of mapping the geologic continuity between wellbores drilled through earth formations is described in U.S. Pat. No. 5,144,590 issued to Chon. The method disclosed in the Chon '590 patent includes inserting a seismic energy source into one wellbore which penetrates the reservoir, and measuring the seismic energy which travels to receivers placed in another wellbore, which also penetrates the reservoir. The spectral characteristics of the energy which reaches the receivers as it travels from the source can be analyzed to determine if the reservoir is geologically continuous between the wellbores.

The method described in the Chon '590 patent uses seismic energy at a plurality of source frequencies to determine geological continuity of the earth formations between the wellbores. In certain cases the reservoir may be geologically connected between the wellbores, but the hydraulic properties of the reservoir may be discontinuous between the wellbores. Continuity of hydraulic properties is of particular interest to the wellbore operator in order to determine the areal extent of the reservoir, and the ultimate fluid recovery expected from the reservoir.

SUMMARY OF THE INVENTION

The invention is a method for determining a degree of acoustic non-linearity of an earth formation from seismic signals transmitted into the formation from within one wellbore and received from the formation in another wellbore. The seismic signals include two selected discrete frequencies. The method includes spectrally analyzing the received signals, determining from the spectral analysis the presence of a frequency representing a sum of the two selected frequencies, and determining a relative amplitude of the sum frequency with respect to the amplitudes of the two selected discrete frequencies.

In a particular embodiment of the invention, the method includes determining the presence of a frequency in the spectrally analyzed signals representing the difference between the selected discrete frequencies, and determining the presence of harmonic multiples of one of the two selected discrete frequencies. The amount of frequency scatter at each spectral peak representing the two selected discrete frequencies can also be determined by measuring a peak width at half the maximum amplitude of the peak, or by subtracting the source spectrum from the received signal spectrum.

In another embodiment of the invention, the absence of a spectral peak representing either one of the two selected frequencies indicates that the thickness of the particular layer of the earth formation has a thickness of about equal to the wavelength of the seismic energy, or some integer multiple of the wavelength.

DESCRIPTION OF THE PREFERRED EMBODIMENT

Figure 1:
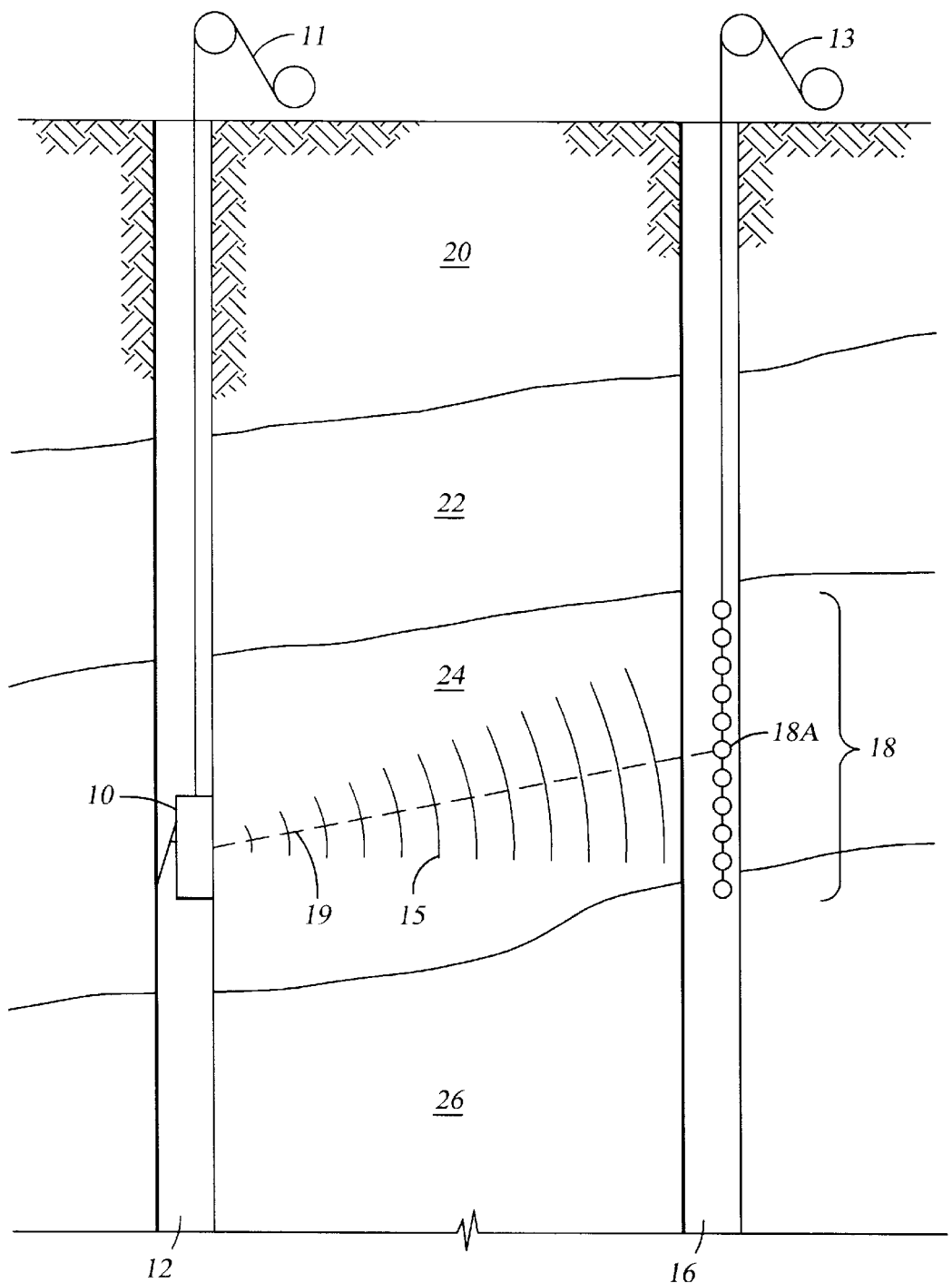
FIG. 1 shows the manner in which seismic signals for the invention are acquired.

The invention uses measurements of signals resulting from seismic energy transmitted between wellbores drilled through earth formations. Referring now to FIG. 1, the seismic signals can be acquired by applying seismic energy at various selected depths within a first wellbore 12 drilled through the earth formations 20, 22, 24, 26, and receiving the energy transmitted through the earth formations in a second wellbore 16 drilled through the same earth formations and located some distance from the first wellbore 12. The distance between the wellbores 12, 16 is not critical and can be between several hundred and several thousand feet.

A seismic energy source 10 is shown positioned at a selected depth in the first wellbore 12. The source 10 is preferably a vibrator or other similar source known in the art which can generate seismic energy at selected discrete frequencies. Preferably the source 10 generates seismic energy at selected frequencies within a frequency range from 10 to 50 Hz up to about 2,000 to 3,000 Hz. The source 10 can be extended into and withdrawn from the first wellbore 12 by means of an armored electrical cable 11 or any similar conveyance device known in the art.

The second wellbore 16 can be located some distance, nominally from a few hundred to several thousand feet as previously explained, from the first wellbore 12 and is shown in FIG. 1 as penetrating the same earth formations 20, 22, 24, 26. A seismic receiver unit, shown generally at 18 and including a plurality of spaced apart receiver elements, such as shown at 18A, can be positioned at a selected depth in the second wellbore 16. The receiver unit 18 can be inserted into and withdrawn from the second wellbore 16 by means of a second electrical cable 13 or similar conveyance device known in the art. Signals generated by the individual receiver elements 18A can be conducted to the earth's surface along the second cable 13 for recording and interpretation.

The selected depth for the receiver unit 18 should be chosen so that its position within any one of the formations 20, 22, 24, 26 corresponds to the position of the source 10 within the same formation in the first wellbore 10 at the selected depth of the source 10. The selection of the depth at which to position the receiver unit 18 should account for differences between the depth of intersection of the individual earth formations in the first 12 and in the second 16 wellbore. This difference in depth between wellbores is known in the art and corresponds to the "regional dip" of the earth formations. Regional dip may be determined by any one of a number of well known methods such as interpretation of measurements made by diplog or similar instrument, or by correlation of other types of well log measurements made in both the first 12 and second 16 wellbores.

The receiver unit 18 is shown in FIG. 1 as including eleven individual receiver elements 18A. The receiver elements 18A can be spaced apart from each other by a nominal distance such as about five feet. The number of receiver elements 18A in the receiver unit 18, and the spacing between the elements 18A are not critical to the invention and so are not to be construed as limitations on the invention. As few as one receiver element could be used, but for reasons of convenience and economy of operation, the receiver 18 preferably includes as many receiver units as can be practically inserted into the second wellbore 16 and carried by the electrical cable 13 at one time. Each element 18A in the receiver unit 18 can be a hydrophone, or can be a single-component geophone or a multiple component geophone of types known in the art.

The source 10 is periodically energized to emit seismic energy, shown in the form of waves 15, into the earth formations 20, 22, 24, 26. The source 10 should be operated to emit the energy at selected discrete frequencies. The manner of selecting the frequencies will be further explained. The waves 15 travel through the formations 20, 22, 24, 26 and eventually reach the receiver elements 18A. Excluding, for the simplicity of this description, the effects of any refraction which may take place in the formations, the waves 15 generally travel along a shortest path, shown at 19, between the source 10 and the centrally located receiver element 18A. If there are small variations in the regional dip between wellbores 12, 16 so that the central receiver element 18A is not in a correspondent depth position, it is likely that one of the other receiver elements 18A will generally be located along or very close to the shortest path 19. Which one of the receiver elements 18A is along or closest to the shortest path 19 can be determined by finding the receiver signal representing the shortest travel time of the seismic energy from the source 10 to each receiver element 18A, or alternatively by relative phase measurement between the signals of each of the receiver elements 18A.

After the source 10 has been energized at the appropriate frequencies and the signals acquired by the receiver unit 18, both the source 10 and the receiver unit 18 can then be moved to a different selected depth in each respective wellbore 12, 16, and the acquisition process can be repeated. The amount by which the source 10 and the receiver unit 18 are moved in each wellbore 12, 16 for each successive acquisition sequence is a matter of convenience for the system operator, and is related to the desired resolution of the survey. It is contemplated that an acquisition interval of about ten feet along each wellbore will provide adequate resolution for most purposes, but this suggested acquisition interval is not meant to limit the invention.

As previously explained, the source 10 should be operated at selected discrete frequencies. The reason for using discrete frequencies is related to the intended measurement of the degree non-linearity in the acoustic response properties of the earth formations 20, 22, 24, 26. It has been determined through laboratory experiments that by measuring the acoustic response of rocks to acoustic energy at selected discrete frequencies, an indication can be made of the extent of the non-linear acoustic properties of the particular rocks. See for example, P. A. Johnson et al, *Manifestation of Nonlinear Elasticity in Rock: Convincing Evidence Over Large Frequency and Strain Intervals From Laboratory Studies*, Journal of nonlinear Processes in Geophysics, MS No: 95023, 1995. The number of selected discrete frequencies and a range of frequencies suitable for this invention will be further explained.

It has been determined in testing this invention that indications of non-linearity in the earth formations between the two wellbores 12, 16 can be determined by spectral analysis of the signals detected by the receiver unit 18 in response to the acoustic energy. Indications of non-linearity in the formations 20, 22, 24, 26 have been correlated to the presence of fluids in pore spaces in the formation, and to pore spaces which are sufficiently large in size to constitute a rock which is permeable to the flow of fluid therethrough.

The signals detected by the receiver elements 18A can be analyzed using a spectral analyzer. If the signals are converted to digital form, the analyzer can include numerical fast Fourier transforms or similar spectral analysis techniques known in the art. The particular responses which have been observed as a result of non-linearities in earth formations between wellbores include the generation of harmonic multiples of the frequency of the applied seismic energy. Another response observed as a result of non-linearities includes generation of acoustic energy at frequencies which represent the sum and the difference of the frequencies of the applied seismic energy when the seismic energy is applied at two discrete frequencies simultaneously. The amount of non-linearity in the particular earth formation located between the wellbores is related to the relative amplitudes of the harmonic multiples and to the relative amplitudes of the sum and difference frequencies.

As an example, discrete frequencies of 700 and 1200 Hz can be applied by the source. In formations having at least some non-linear acoustic properties, these input frequencies would result in frequencies in the acoustic energy detected by the receiver of 500, 700, 1200 and 1900 Hz, as well as harmonic multiples of the 700 Hz and 1200 Hz energy applied to the formations by the source. The discrete frequencies should be transmitted simultaneously if analysis of the sum and difference frequencies is desired. Otherwise the frequencies may be applied separately. Preferably, to facilitate interpretation of the received signals, the source frequencies selected should provide sum and difference frequencies which are different from either one of the selected discrete frequencies themselves. The sum and difference frequencies should also be different from the harmonic multiples of the selected discrete frequencies. In an example of data interpretation to follow, the consequences of selection of discrete frequencies which include harmonic multiples which are identical to the sum frequency will be shown.

In selecting the discrete frequencies, the vertical thickness of a geologically continuous layer (such as 22 in FIG. 1)

which connects both the first wellbore 12 and the second wellbore 16 should also be taken into consideration. Typically the discrete frequencies should be selected so that the formation thickness is any amount other than about equal to the wavelength of the acoustic energy, or a multiple of the wavelength. As is known in the art, the thickness of the geologically continuous layer can be determined, among other ways, by correlation from well logs which have been surveyed in both the first wellbore and the second wellbore. An example of a signal recorded in layer having a thickness of about one-half wavelength of the seismic energy will follow. It is preferable to use frequencies nearer to the high end of the useful frequency range, which as previously explained is about 3,000 Hz, because high frequencies will provide results more indicative of the properties of the formations to straight-line transmission of the seismic energy.

Figure 2:
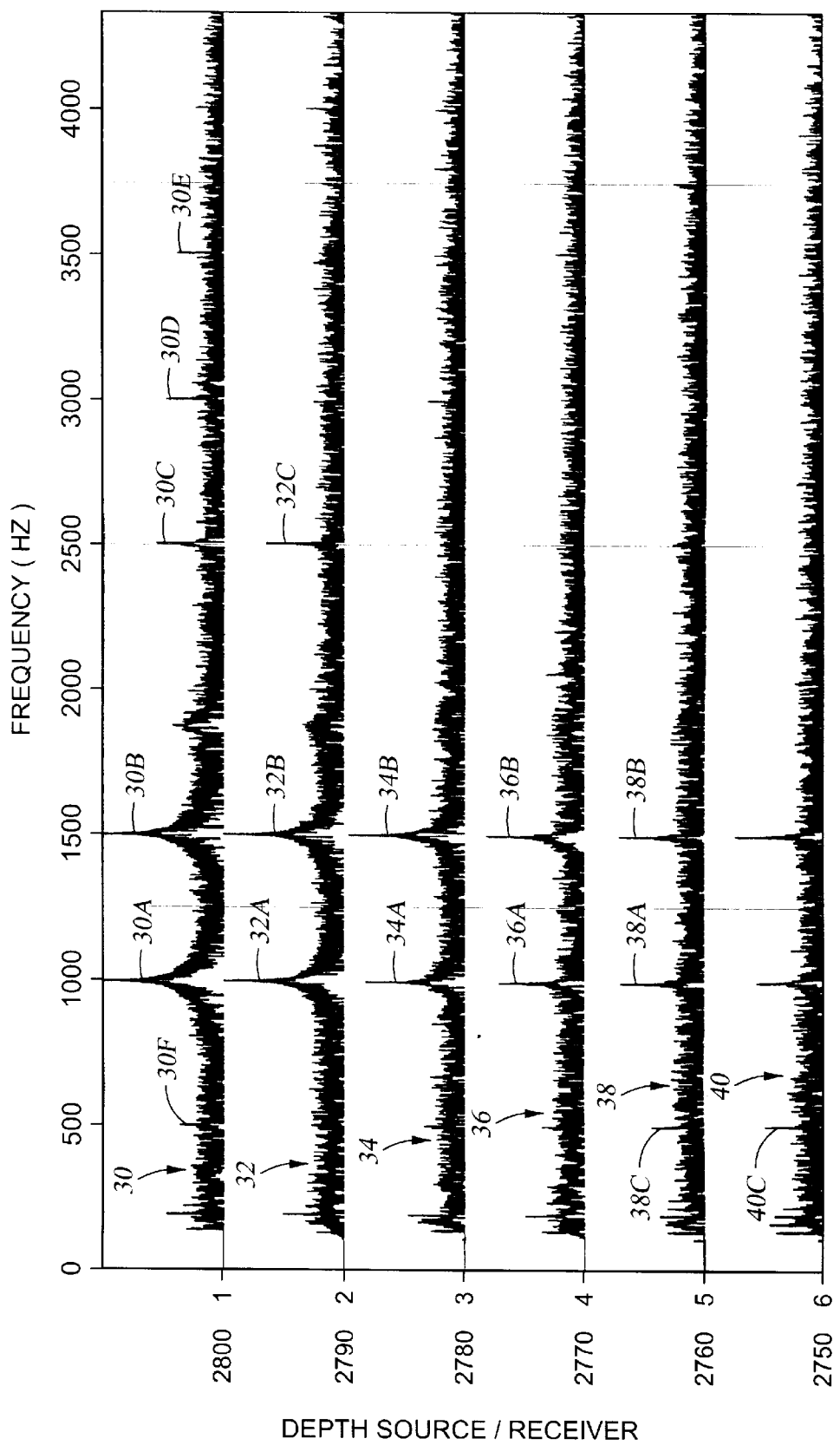
FIG. 2 shows a spectral analysis of received signals where the earth formations are relatively homogeneous and have substantially linear acoustic properties.

An example of responses to various types of substantially linear-response earth formations can be observed by referring to FIG. 2. FIG. 2 includes spectral analyses of the signal received at the receiver element (18A in FIG. 1) located along the shortest path (19 in FIG. 1) at each of a plurality of different selected depths within the two wellbores (12, 16 in FIG. 1). The responses in FIG. 2 were those obtained when the source (10 in FIG. 1) was operated to emit 1,000 Hz and 1,500 Hz energy simultaneously. Curves 34 and 36 show substantially only the discrete (base) frequencies (1,000 and 1,500 Hz) in the received response. The formations located between the wellbores 12, 16 corresponding to curves 34 and 36 are substantially linear-responding. Examples of formations which respond as shown in curves 34, and 36 include shales. Shales typically have relatively soft, low-velocity solid matrix material, and the grain sizes of the solid matrix are so small that the formation behaves substantially as a homogeneous material. Other formations which could exhibit the response as shown in curves 34 and 36 include carbonates such as limestone and dolomite in which there is substantially no pore space. It should also be noted that the amplitude "peaks" at the 1,000 and 1,500 Hz base frequencies are relatively free of frequency scattering effects, indicating further that the formation through which the acoustic energy has passed is substantially homogeneous.

An example of a non-linearly responding formation is shown at curve 30. 1,000 and 1,500 Hz base frequency peaks, 30A, 32A respectively, show substantial "widening" or "spreading" of the received response around the base frequency. It should also be noted that a peak 30F appears at the difference frequency (500 Hz), as well as peaks at the sum frequency 2,500 Hz shown at 30C, the second harmonic of the 1,500 Hz base frequency (3,000 Hz), shown at 30D, and a sum of the second harmonic of the 1,000 Hz base frequency (2,000 Hz) with the 1,500 Hz base frequency shown at 30E at 3,500 Hz. It should be noted that the 3,000 Hz peak 30D may be a combination of various amounts of third harmonic of 1,000 Hz and second harmonic of 1,500 Hz. More appropriate selection of the base frequencies, as in the previous example of 700 and 1,200 Hz, can avoid this type of confusion. The formation response shown by curve 32 is similar in nature to that shown in curve 30 but to a lesser degree.

Formations exhibiting only difference peaks 38C, 40C are shown in curves 38 and 40, respectively. The formations through which the acoustic energy passed in these cases interpreted as having a lower degree of non-linearity than the formations corresponding to curves 30 and 32.

The degree of non-linearity can be quantified as the relative amplitude of the harmonic frequency peaks (such as 30D), or the relative amplitude of the sum and difference peaks (such as 32C and 38C), with respect to the amplitude of the base frequency peaks (such as 36A, 36B) for any individual curve. An additional method for quantifying the degree of non-linearity can be to calculate a value of the frequency "scattering width" for each of the base frequency peaks between points at which the peak is at half of its peak amplitude. Methods for determining the peak width from the relative amplitudes and the "scattering width" of the amplitude curve around each discrete frequency are well known in the art. Alternatively, the spectrally analyzed received signals can be subtracted from a spectral analysis of the signal generated by the source (10 in FIG. 1) to determine an amount of the scattering width for each discrete frequency. If there is substantial frequency scattering, a substantial residual will exist in the difference between the source spectrum and the received signal spectrum.

Figure 3:
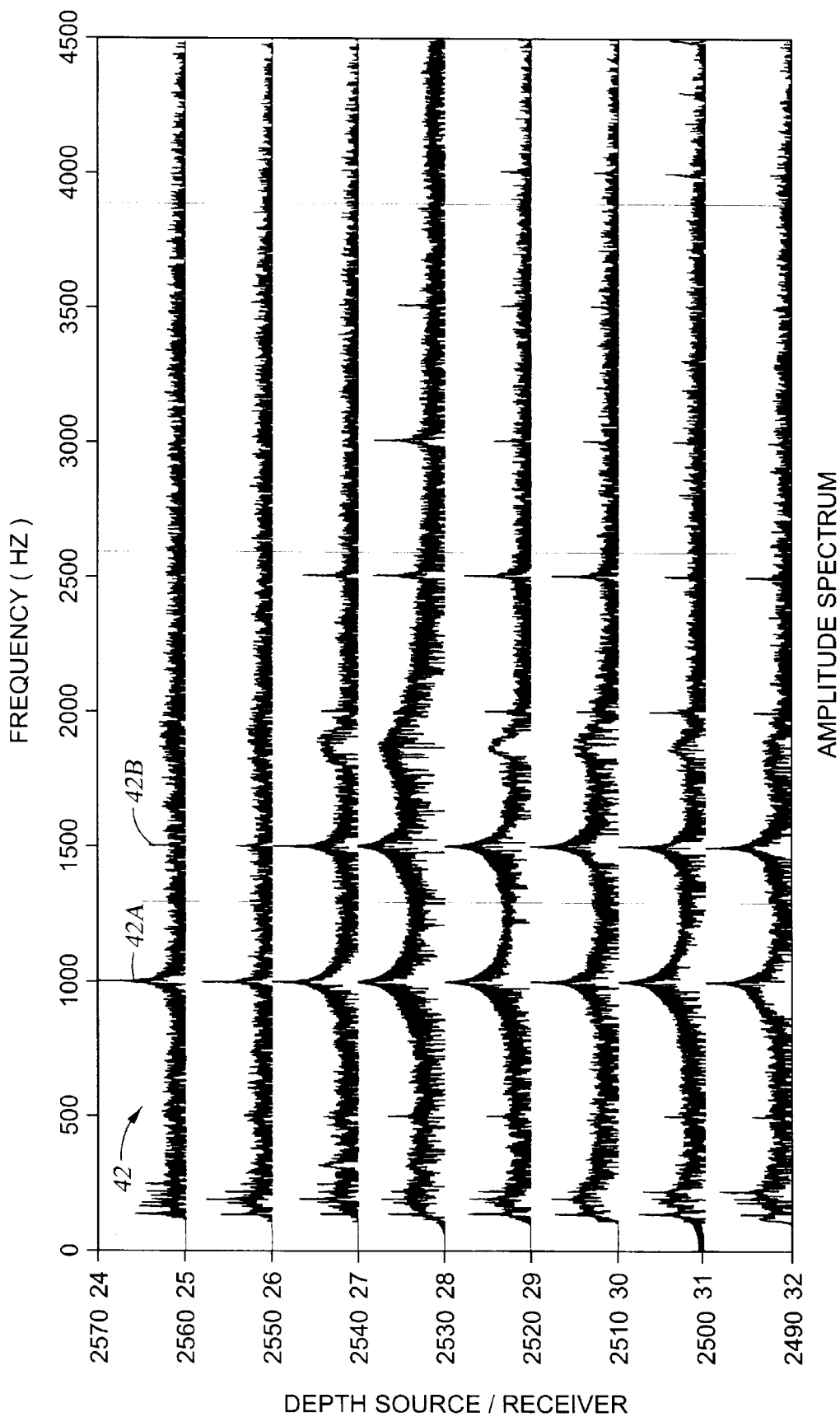
FIGS. 3 and 4 show a spectral analysis of the received signals where the earth formations are relatively inhomogeneous and have substantially non-linear acoustic properties.
Figure 4:
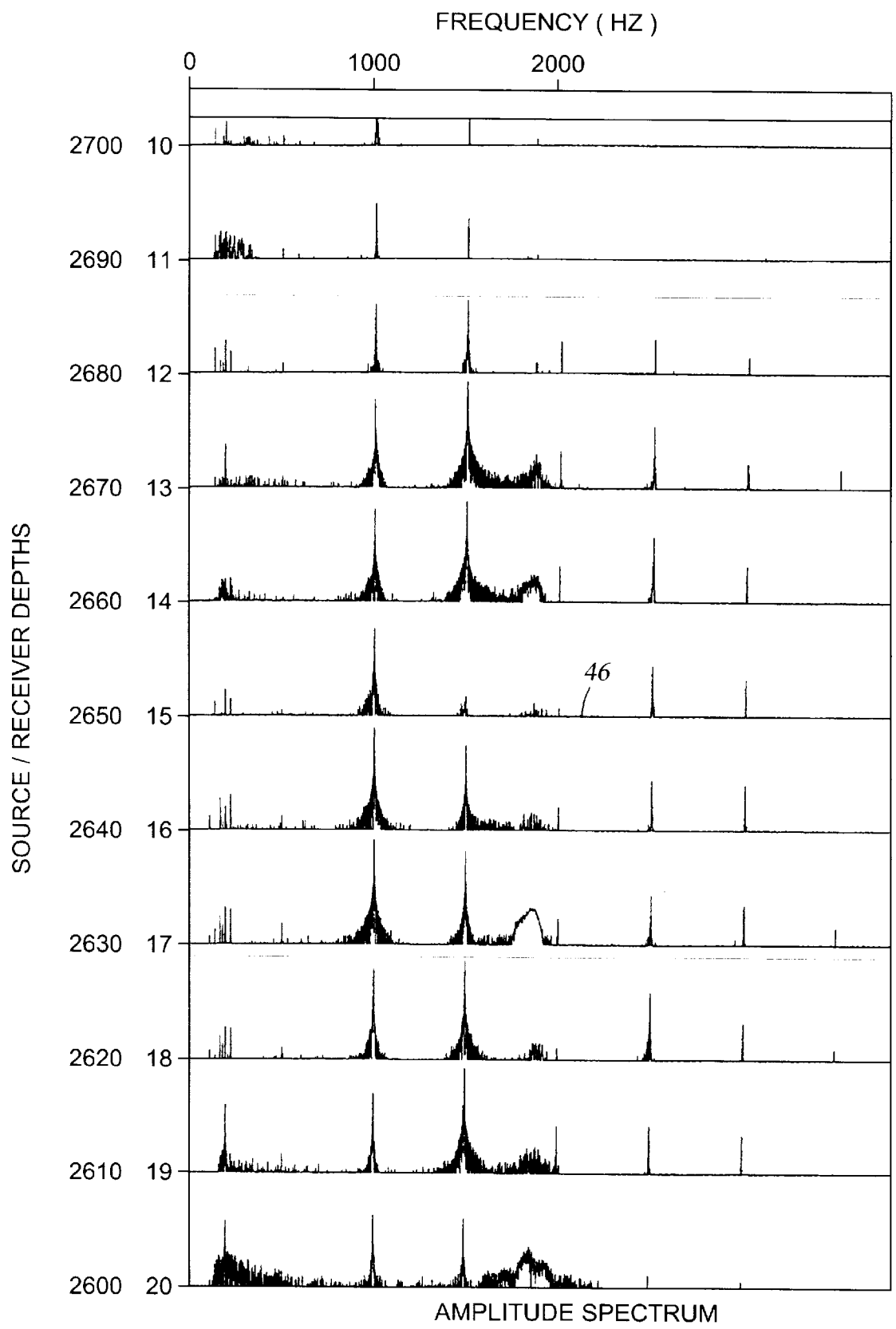

Referring now to FIG. 3, the apparent thickness of any one of the formations through which the acoustic energy is passed can be estimated by observing a reduction in amplitude or absence of one of the base frequency peaks in the receiver response curve. For example, in curve 42, peak 42A for the 1,000 Hz base frequency has a relatively large amplitude. Peak 42B corresponding to the 1,500 Hz base frequency is substantially reduced in amplitude. There are no harmonic peaks in curve 42 to indicate that the 1,500 Hz energy has been modified by non-linearity of the formation. The response of peak 42B is the result of the receiver element being positioned in a "null" location within the formation. Null locations are more likely when the acoustic velocity of the formation is such that it acts as a "waveguide" (see U.S. Pat. No. 5,144,590 issued to Chon), and when the thickness of the formation is an integer multiple of the wavelength of the acoustic energy. The existence of the null location can also be used to determine the overall acoustic velocity of the formation between the wellbores using the thickness determined from other methods as previously explained, since the frequency of the acoustic energy is known. Another example of a null location in the 1,500 Hz signal can be observed at curve 46 in FIG. 4.

DESCRIPTION OF AN ALTERNATIVE EMBODIMENT

It is also possible to determine the degree of non-linearity in the earth formations (20, 22, 24, 26) by analyzing seismic signals transmitted at a single frequency. The manner of conducting a survey at a single discrete frequency is similar to the manner of conducting a survey as described in the first embodiment of the invention. In this embodiment however, the source 10 is operated at a single selected frequency, which is preferably selected to avoid the presence of null locations as described in the first embodiment of the invention.

If the formations through which the seismic signals are transmitted have substantial non-linearity, the received signals will include harmonic multiple frequencies (such as shown at 30D in FIG. 2). The relative amplitude of the harmonic multiple frequencies with respect to the amplitude of the discrete frequency in the spectrally analyzed signals can provide a quantitative estimate of the degree of non-linearity of the formation.

Spectral peaks occurring at the selected frequency can also exhibit "spreading" or frequency scattering (such as shown at 30A in FIG. 2). A peak width at half-maximum amplitude can be calculated at the discrete frequency to provide a quantitative estimate of the degree of non-linearity in the formation. Alternatively, the difference between the spectrum of the energy output of the source (10 in FIG. 1), and the spectrum of the received signals can be calculated to determine the degree of frequency scattering, and consequently the degree of heterogeneity.

DESCRIPTION OF A PARTICULAR EMBODIMENT

Analysis of another property of the seismic signals detected by the receiver unit 18 can be used to determine the extent, along the wellbores (12, 16 in FIG. 1), of a particular layer within the earth formations (20, 22, 24, 26 in FIG. 1).

Particularly, the relative phase between measurements made at successive selected depths within the wellbores can be measured. It has been determined that when the relative phase difference between the signals received at one selected depth and the adjacent selected depth is very small, then the formation layer is substantially continuous between those selected depths. Large changes in phase have been correlated to boundaries between formation layers having different acoustic transmission properties.

The phase difference can be measured by cross-correlating the signals measured, for either one of the two discrete frequencies, at two adjacent selected depths. Other phase measurement methods are well known in the art, and may also be used for this invention.

Those skilled in the art will devise other embodiments of this invention which do not depart from the spirit of the invention as disclosed herein. Therefore the scope of the invention should be limited only by the attached claims.

What is claimed is:

1. A method for determining non-linearity of an earth formation from seismic signals transmitted into said formation from within one wellbore and received in another wellbore, said seismic signals including two selected discrete frequencies, the method comprising:

spectrally analyzing said received signals;

determining presence of a frequency representing a sum of said two discrete frequencies in said spectrally analyzed signals; and determining relative amplitude of said sum frequency with respect to amplitudes of said two discrete frequencies.

2. The method as defined in claim 1 further comprising:

determining presence of a frequency representing a difference of said two discrete frequencies in said spectrally analyzed signals; and determining relative amplitude of said difference frequency with respect to amplitudes of said two discrete frequencies.

3. The method as defined in claim 1 further comprising:

determining presence of a frequency representing a harmonic multiple of one of said two discrete frequencies in said spectrally analyzed signals; and determining relative amplitude of said harmonic multiple with respect to amplitude of said one of said two discrete frequencies in said spectrally analyzed signals.

4. The method as defined in claim 1 further comprising:

determining a value of peak width for a response peak corresponding to one of said two discrete frequencies in said spectrally analyzed signals.

5. A method for cross-well seismic exploration, comprising:

inserting a seismic source to a selected depth in a first wellbore;

inserting a seismic receiver to a corresponding depth in a second wellbore;

energizing said source at two selected discrete frequencies;

receiving signals at said receiver;

spectrally analyzing said received signals;

determining presence of a frequency representing a sum of said two discrete frequencies in said spectrally analyzed signals; and determining relative amplitude of said sum frequency with respect to amplitudes of said two discrete frequencies in said spectrally analyzed signals.

6. The method as defined in claim 5 further comprising:

determining presence of a frequency representing a difference of said two discrete frequencies in said spectrally analyzed signals; and determining relative amplitude of said difference frequency with respect to amplitudes of said two discrete frequencies in said spectrally analyzed signals.

7. The method as defined in claim 5 further comprising:

determining presence of a frequency representing a harmonic multiple of one of said two discrete frequencies in said spectrally analyzed signals; and determining relative amplitude of said harmonic multiple with respect to amplitude of said one of said two discrete frequencies in said spectrally analyzed signals.

8. The method as defined in claim 5 further comprising:

determining a value of peak width for a response peak corresponding to one of said two discrete frequencies in said spectrally analyzed signals.

9. A method for determining non-linearity of an earth formation from seismic signals transmitted into said formation from within one wellbore and received from said formation in another wellbore, said seismic signals including two selected discrete frequencies, the method comprising:

spectrally analyzing said received signals;

determining presence in said spectrally analyzed signals of a frequency selected from the group consisting of: a sum of said two discrete frequencies, a difference between said two discrete frequencies, a harmonic multiple of one of said two discrete frequencies; and determining a relative amplitude of said selected frequency with respect to amplitudes of said two discrete frequencies in said spectrally analyzed signals.

\* \* \* \* \*